Oct. 23, 1928.
J. I. HAASE
1,689,133
METHOD OF AND MACHINE FOR PERFORATING LAMINATED FABRICS
Filed Aug. 7, 1926      2 Sheets-Sheet 1
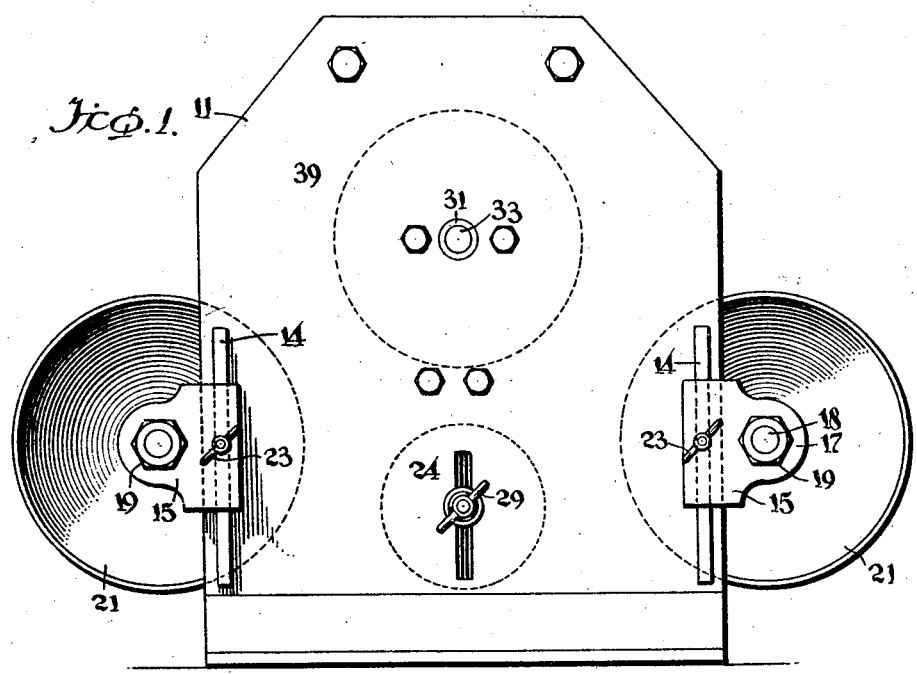
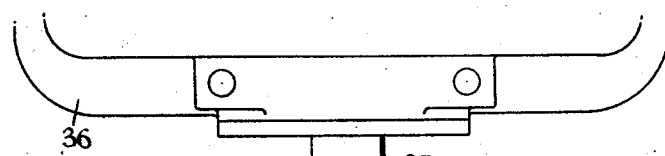
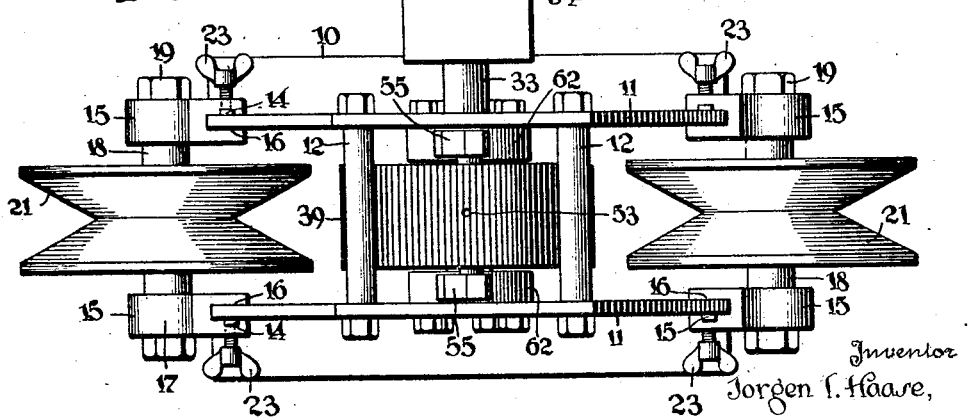
Inventor
Jorgen I. Haase,
By
Attorney Oct. 23, 1928.  
J. I. HAASE  
1,689,133  
METHOD OF AND MACHINE FOR PERFORATING LAMINATED FABRICS  
Filed Aug. 7, 1926    2 Sheets-Sheet 2
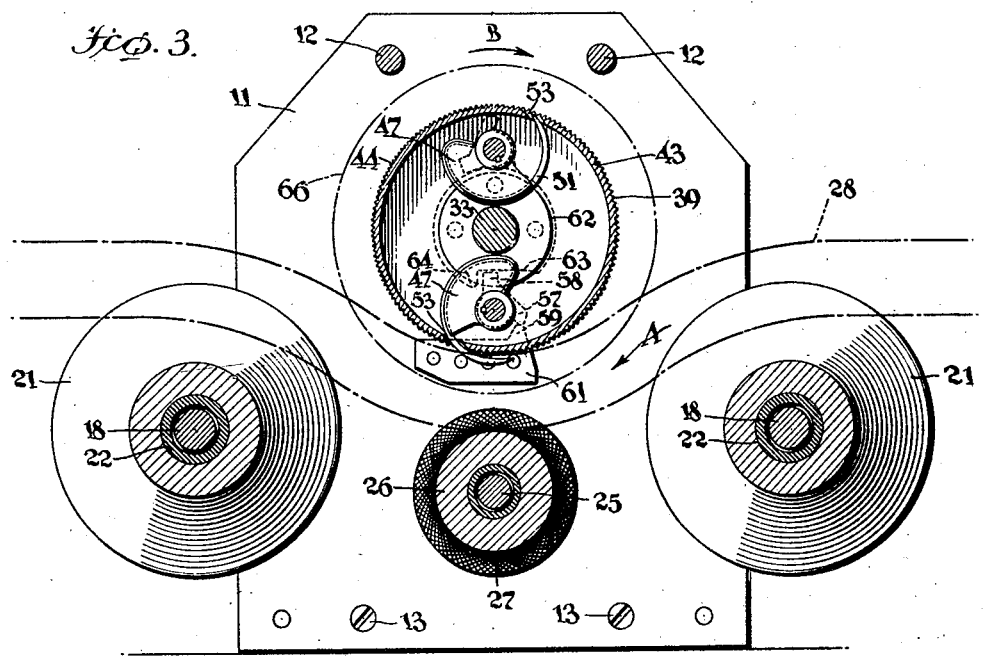
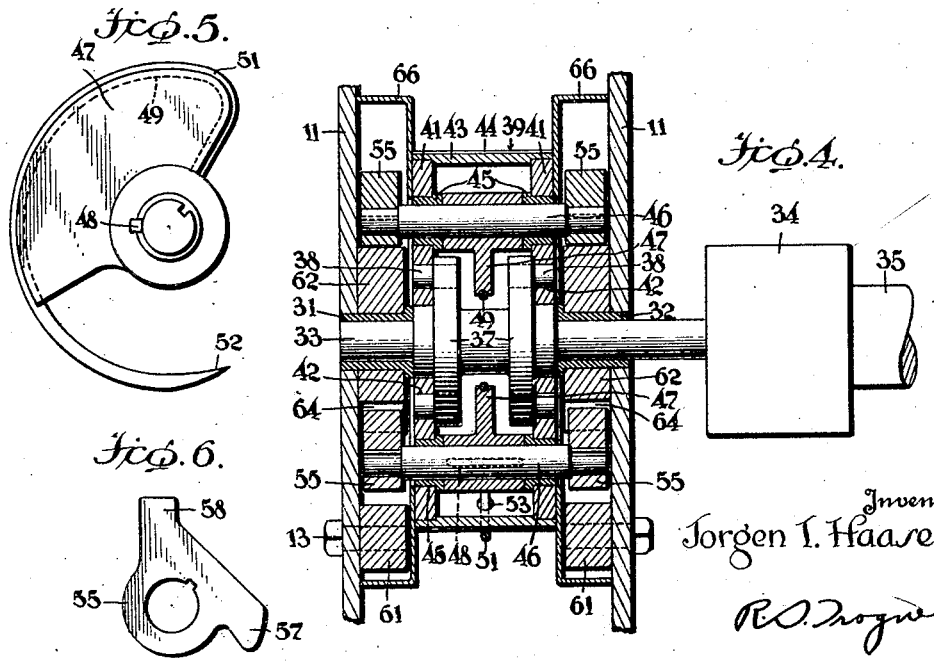
Inventor  
Jorgen I. Haase,
Attorney Patented Oct. 23, 1928.

1,689,133

UNITED STATES PATENT OFFICE.

JORGEN I. HAASE, OF AKRON, OHIO, ASSIGNOR TO THE GOODYEAR TIRE & RUBBER COMPANY, OF AKRON, OHIO, A CORPORATION OF OHIO.

METHOD OF AND MACHINE FOR PERFORATING LAMINATED FABRICS.

Application filed August 7, 1926. Serial No. 127,754.

My invention relates to the manufacture of laminated fabrics, and it has particular reference to a method of, and to a machine for, perforating such material, to permit removal of air entrapped between the plies of fabric during the assembly thereof.

The invention has particular utility in connection with the manufacture of rubber hose, which is usually formed by concentrically assembling plies of rubberized cross woven fabric or braided material. Bubbles of air are entrapped between the laminations during the assembling process, and it is desirable to remove them, prior to the vulcanization of the article, in order to obtain a more satisfactory finished product.

The present invention has for its primary objects the provision of a method of removing air entrapped between the plies, and a machine with which the method may be practiced. In a general aspect, the invention resides in perforating the fabric at intervals, along the length thereof, to provide apertures through which the air may escape, and in compressing the assembled fabric sufficiently to force the air between the laminations through the apertures.

Various specific objects and the advantages to be derived from a practice of the invention will become apparent from a perusal of the following detailed description, wherein reference is made to the accompanying drawings, in which;

Fig. 1 is a side elevational view of a machine embodying the principles of the invention;

Fig. 2 is a plan view thereof, parts being removed for the sake of clearness;

Fig. 3 is a longitudinal cross-sectional view of the machine shown in Fig. 1;

Fig. 4 is a fragmentary transverse cross-sectional view;

Fig. 5 is a detail view of a perforating needle; and

Fig. 6 is a detail view of a cam member associated with the needle.

The machine comprises a bed frame 10 to which is secured a pair of upright side members 11, that are suitably spaced and are rigidly positioned by means of bolts 12 and screws 13. Vertically disposed guide members 14 are provided upon the side plates 11 adjacent the outer edges thereof, to serve as keyways and holding means, for a plurality of slidably mounted blocks 15, formed with slots 16 that fit around the edges of the side members 11.

Each block 15 is provided with an enlarged portion 17 which is pierced for the reception of an axle 18 that is secured to oppositely disposed blocks 15 by means of nuts 19. Grooved rollers 21, having bearing sleeves 22 disposed within their hub portions, are loosely mounted upon the axles 18 between the side plates. Suitable means, such as wing nuts 23, may be provided on the blocks 15 to hold them and the rollers 21 in any desired position with respect to the frame.

The side plates 11 are provided with aligned slots 24, at the central portions thereof, for the reception of an axle 25, upon which is positioned a grooved roller 26 by means similar to that employed for the mounting of the rollers 21. Preferably, the roller 26 is provided with a knurled face 27 to enable it to contact firmly with material 28, diagrammatically indicated by dot and dash lines (Fig. 3) that is adapted to be disposed within the groove of the roller. Locking nuts 29 may be provided to position the roller 26 at any desired point with respect to the slot 24. The rollers 21, 26 and 21 are adapted to serve as a conveyor and a support for the material as it passes through the machine and is perforated.

Aligned bearing bushings 31 and 32 (Fig. 4) are respectively disposed in the upper central portions of the members 11 for the reception of a shaft 33, one end of which projects beyond the frame. The projecting end of the shaft terminates in a coupling member 34 that is secured to a drive shaft 35 of a suitable machine, such as an electric motor, indicated schematically by the reference numeral 36 in Fig. 2.

The shaft 33 is provided with a pair of spaced integrally formed collars 37 adjacent its mid portion, in which are disposed a plurality of pins 38 that are adapted to support a drum, indicated generally by the reference numeral 39. The drum comprises a pair of annular side plates 41, provided with aligned apertures 42 for the reception of the pins 38, upon which is mounted a cylindrical shell 43, the outer face 44 of which is preferably corrugated.

The side walls 41 of the drum 39 are provided with a plurality of aligned apertures in which are disposed bearing bushings 45 having journaled therein shafts 46, that project beyond either side wall 41. Segmental members 47, disposed within the drum, are secured upon the respective shafts 46 by suitable means such as keys 48. Each member 47 is provided with a groove 49 in its periphery, in which is secured a curved length of spring steel 51 that extends beyond the edge of the segmental member, and which is provided with a needle point 52 to puncture the laminated material. By reference to Figs. 3 and 4, it will be noted that each needle 51 is so dimensioned and is so positioned that its point 52 is disposed adjacent the inner periphery of the drum 39, and that it protrudes normally into an aperture 53 formed in the drum.

Cam members or triggers 55 are keyed to the projecting portions of the shafts 46, and they are adapted to cooperate with members secured to the side walls 11 to impart an intermittent reciprocatory movement to the needles 51. As best shown in Fig. 6, each member 55 is provided with a trigger 57, by means of which the needle 51 is forced outwardly, and with a trigger 58, by means of which the needle is returned to its inoperative position. Normally, the triggers 57 extend in a radially outward direction, for periodic contact with fingers 59, to effect an outward movement of the needle 51. The fingers 59 project upwardly from similarly formed cam members 61 that are secured to the side walls 11 adjacent the lower trace of the drum 39.

The triggers 58 are disposed inwardly from the triggers 57 in juxtaposition to similarly formed annular cam members 62, that are rigidly positioned around the main drive shaft 33 and on side plates 11. Each cam member 62 is formed with a cut-away portion 63 at the lower side thereof, which terminates in a finger 64 that is adapted to actuate the juxtaposed trigger 58. These members are so dimensioned that the triggers 58 and the fingers 64 contact, to effect a withdrawal of the associated needle 51, after the triggers 57 and fingers 59 have cooperated to force the needle outwardly to puncture the laminated article.

For the purpose of excluding dirt from the parts and to insure a smooth operation of the machine, the members 55, 61, and 62, that are disposed between the side walls 11 and the drum 39, are surrounded by dust guards or housings 66. These members may be made of sheet steel, and they may be provided, if desired, with felt packing rings in order to exclude all dust.

In the operation of the machine, the rollers 21 and 26 are so adjusted with respect to the drum 39 as to exert a certain degree of pressure upon the laminated article, that is disposed within the grooves of the rollers for movement through the machine in the direction indicated by the arrow A, (Fig. 3). When the article is positioned between the drum and the rollers in the manner indicated, the shaft 33 is rotated, in the direction indicated by the arrow B, (Fig. 3) to turn the drum 39. The hose is forced through the machine by virtue of the frictional driving contact obtained thereon by means of the corrugated face 44 of the drum 39 and the knurled surface 27 of the roller 26. As the drum 39 rotates, the needles 51 are successively forced through the periphery thereof to puncture the surface of the article at substantially regular intervals. The pressure exerted upon the article by the drum and the rollers is sufficient to force the air entrapped between the punctures toward them to permit its escape.

Referring particularly to Fig. 3 it will be seen that, as the drum 39 rotates, the needles 51 are constrained to move therewith, inasmuch as they are mounted thereon by means of the shafts 46. As the cam members 55, with their associated needle 51, approach the lowermost position, the triggers 57 engage the fingers 59 formed on the members 61. Initially, a full contact is obtained between the faces of the engaging parts, but this position is maintained only for an instant, since the drum 39 is constantly rotating. The continuing movement of the drum as a unit, and the localized retarding action exerted on the triggers 57 by the fingers 59, causes the segmental member 47 to rotate about the axis of the shaft 46, thus forcing the needle 51 through the aperture 53 in the periphery of the drum into the laminated article. At the same time, the triggers 57 slip over the faces of the fingers 59, and clear them as the needle is pushed to its outermost limit. Due to the rapidity of rotative motion, immediately after the needle 51 is projected through the periphery of the drum, in the lower position illustrated in Fig. 3, the triggers 58, which have, in the meantime, entered the slots 63, engage the fingers 64 formed on the members 62. Engagement of the parts 58 and 64 causes a reversal of the rotative motion of the segmental member 47 to return the needle 51 within the drum.

This construction permits the needles 51 to project momentarily from the periphery of the drum to perforate the laminated material. The operation is quite rapid, and it can scarcely be followed by the eye when the machine is running at a normal speed. Inasmuch as the article is traveling in the same direction as the tangentially engaging portion of the drum 39, the bent needle 51 does not make a very large puncture in the surface of the fabric. It does, however, enter between the laminations for a slight extent to facilitate the removal of air entrapped between the successive punctures.

It will be apparent from the foregoing description that a machine is provided by means of which air bubbles may be removed from laminated material in a highly efficient manner. Obviously, the utility of the machine is not limited for use on laminated fabrics, but it may be employed in other arts where it is desired to produce a plurality of small apertures. The single preferred form of a machine for practicing the invention is, of course, susceptible to various changes without departing from the principles of the invention, and it is intended, therefore, that only such limitations should be imposed as are set forth in the appended claims.

What I claim is:

1. The method of removing entrapped air from a length of laminated material which consists in piercing the material at a plurality of spaced points and in forcing the air from between the laminations by subjecting the material to pressure.

2. The method of removing entrapped air from a length of laminated material which comprises subjecting the material to pressure to force the air in one direction, piercing the laminations to provide an aperture for the escape of air, and forcing the air compressed to escape by the pressure from the apertures formed by the piercing operation.

3. A machine for removing entrapped air from laminated material comprising means to support the material, a rotatable member adapted to contact with the material, and means contained within and movable from the rotatable member to perforate the material.

4. A machine for removing entrapped air from laminated material comprising a rotatable member having perforating needles mounted therein, and means to project the needles through the rotatable member to perforate the material.

5. A perforating machine comprising a conveyor system for conducting a length of material to be treated, a drum rotatably mounted for contact with the material, perforating needles associated with the drum, means to force the needles into the material, and means to withdraw the needles from the material.

6. A perforating machine comprising a rotatably mounted drum, spaced perforating needles mounted within the drum, means to rotate the drum, and means to project successively the needles momentarily through the drum to pierce the material at spaced points.

7. A perforating machine comprising a support for a length of laminated material, a drum rotatably mounted for contact with the material, piercing needles mounted within the drum, and cam means to project the needles periodically through the periphery of the drum to perforate the material.

8. A perforating machine comprising a frame, material conveying means associated with the frame, a drum rotatably mounted on the frame for driving contact with the material, piercing needles revolvably mounted within the drum, operating cams for the needles, and means on the frame adapted to cooperate with the operating cams to momentarily force the needles through the periphery of the drum.

9. A perforating machine comprising a frame, conveying rollers positioned in the frame, a drum rotatably mounted on the frame, a plurality of piercing needles rotatably mounted within the drum and adapted to be projected through the periphery thereof, operating cams secured to the needles, means disposed on the frame to contact periodically with the cams to force the needles through the periphery of the drum, and additional means adapted to contact with the cams to effect the return of the needles within the drum.

10. A perforating machine comprising a drum rotatably mounted for contact with material to be treated, a shaft positioned for rotation in the drum, a segmental member keyed to the shaft, an arcuate needle positioned on the segmental member for movement through the periphery of the drum, trigger means secured to the shaft, and cam means fixed with respect to the drum to operate the trigger means to cause a movement of the needle through the drum as it is rotated.

11. A perforating machine comprising a frame, having a pair of spaced side members, a driving shaft journaled in the side members, a drum secured to the drive shaft, a plurality of shafts mounted within the drum and projecting beyond the sidewalls thereof, needles mounted on the shafts, trigger means keyed to the projecting portions of the shafts, and trigger operating means secured to the side members to operate the needles as the drum is rotated.

12. A perforating machine comprising a frame including a pair of side members, a drive shaft journaled in the side members, a drum secured to the drive shaft, a plurality of shafts disposed in the drum and projecting therebeyond toward the side members, needles secured to the shafts, triggers secured to the projecting portions of the shafts, fingers positioned in the side members to actuate the triggers to move the needles outwardly, cams secured to the side plates to move the needles inwardly, and housing disposed around the fingers and cams between the side members and the drums.

13. A method of removing air entrapped between sheets of laminated materials which comprises applying pressure progressively along the material to force the air forward between the laminations of fabric and piercing the material near the region of compression in order to liberate the imprisoned air while the material is under pressure.

14. A machine for removing air from between the sheets of a laminated material which comprises rollers adapted progressively to compress the material, a needle secured to one of the rollers and means to extend the needle quickly from or toward the surface of the roller to which it is secured in order to puncture the material and permit the escape of the air while the material is compressed between the rollers.

15. A machine for liberating air from between the sheets of a laminated material comprising rollers adapted progressively to compress the material, a needle associated and movable with respect to both rollers, and means to thrust the needle into and retract it from the material while the latter is under compression between the rollers.

In witness whereof, I have hereunto signed my name.

JORGEN I. HAASE.